(12) United States Patent
Love et al.

(10) Patent No.: US 11,485,176 B2
(45) Date of Patent: Nov. 1, 2022

(54) WHEEL SPEED SENSING SYSTEM

(71) Applicant: DEERE & COMPANY, Moline, IL (US)

(72) Inventors: Galen R. Love, Independence, KS (US); Robert J. Nogaj, Jr., Dunlap, IL (US)

(73) Assignee: DEERE & COMPANY, Moline, IL (US)

( * ) Notice: Subject to any disclaimer, the term of this patent is extended or adjusted under 35 U.S.C. 154(b) by 511 days.

(21) Appl. No.: 16/581,963

(22) Filed: Sep. 25, 2019

(65) Prior Publication Data

US 2021/0086557 A1   Mar. 25, 2021

(51) Int. Cl.
    B60B 35/00    (2006.01)
    B60B 27/00    (2006.01)
    (Continued)

(52) U.S. Cl.
    CPC ........ B60B 35/006 (2013.01); B60B 27/0068 (2013.01); B60B 27/065 (2013.01);
    (Continued)

(58) Field of Classification Search
    CPC . B60B 35/006; B60B 27/0068; B60B 27/065; B60W 40/10; B60W 2520/26;
    (Continued)

(56) References Cited

U.S. PATENT DOCUMENTS 4,281,628 A * 8/1981 Doundoulakis ......... F02B 53/00
                                                        418/34
4,901,562 A * 2/1990 Beakas ................... G01P 3/443
                                                       73/115.08
(Continued)

FOREIGN PATENT DOCUMENTS

CN   205027774 U    2/2016
EP     2887072 A1   6/2015
(Continued)

OTHER PUBLICATIONS

Atashbar et al., "Integration of Triaxial Hall-Effect Sensor Technology for Gear Position Sensing in Commercial Vehicle Transmissions", IEEE Transactions of Instrumentation and Measurement, vol. 61, No. 3 (Year: 2011).*
(Continued)

Primary Examiner — Nathaniel T Woodward
(74) Attorney, Agent, or Firm — Taft Stettinius & Hollister LLP; Stephen F. Rost (57) ABSTRACT

A wheel speed sensing system for a work vehicle having an engine, a transmission, a differential, and an axle, defining a central longitudinal axis and coupled to the differential. The wheel speed sensing system includes a sensor target disposed at the axle and a sensor configured to transmit a sensor signal, wherein the sensor is located adjacently to the sensor target. The sensor target includes a plurality of step splines each having a top surface and first and second planar sidewalls. The sidewalls of the step splines are aligned along a radius extending from the central longitudinal axis, such that the sides are undercut with respect to the top surface. An intersection of each of the sidewalls with the top surface defines an edge forming a relatively sharp transition configured to be sensed by the sensor. A chamfer at the intersection of the sidewalls and the top surface is also contemplated.

20 Claims, 7 Drawing Sheets

(51) Int. Cl.
*B60W 40/10* (2012.01)
*B60B 27/06* (2006.01)
*G01P 3/44* (2006.01)
*F16H 61/04* (2006.01)

(52) U.S. Cl.
CPC ............... *B60W 40/10* (2013.01); *G01P 3/44* (2013.01); *B60W 2520/26* (2013.01); *B60W 2520/28* (2013.01); *F16H 61/0437* (2013.01)

(58) Field of Classification Search
CPC .... B60W 2520/28; F16H 61/0437; G01P 3/44
USPC ....................................................... 73/115.08
See application file for complete search history.

(56) References Cited

U.S. PATENT DOCUMENTS

| | | | |
|---|---|---|---|
| 5,227,719 A | | 7/1993 | Peterson et al. |
| 5,486,757 A | * | 1/1996 | Easley .................... G01P 3/488 29/434 |
| 5,682,095 A | * | 10/1997 | Mathes .................. G01D 5/147 324/207.2 |
| 5,948,029 A | * | 9/1999 | Straetker .............. B62D 11/183 701/41 |
| 8,167,762 B2 | | 5/2012 | Zink et al. |
| 10,175,062 B2 | | 1/2019 | Ausserlechner |
| 2005/0088037 A1 | | 4/2005 | Beutler et al. |
| 2007/0251319 A1 | * | 11/2007 | Campbell ............... G01P 1/026 73/488 |
| 2013/0218426 A1 | * | 8/2013 | Li ........................... G01L 3/101 701/51 |
| 2014/0121931 A1 | * | 5/2014 | Kellum ............... B60W 10/184 701/93 |
| 2018/0003578 A1 | * | 1/2018 | Leonard .................. G01L 3/109 |
| 2018/0328955 A1 | * | 11/2018 | Kordik .................... G01P 3/488 |

FOREIGN PATENT DOCUMENTS

KR 20130068141 A 6/2013
WO WO2009126126 A1 10/2009

OTHER PUBLICATIONS

Zheng et al., "Mathematical Models of Gear Tooth Speed Sensors with Dual Outputs", Join Inter. IMEKO Symposium Proceedings, pp. 82-86 (Year: 2011).*
Swedish Search Report issued in counterpart application No. 2051116-8 dated Jan. 25, 2021 (03 pages).
Great Britain Search Report issued in counterpart application No. 2014967.0 dated Mar. 18, 2021 (05 pages).

* cited by examiner

WHEEL SPEED SENSING SYSTEM

FIELD OF THE DISCLOSURE

The present invention generally relates to a work vehicle, and more particularly to a wheel speed sensor system for a multi-axle work vehicle, such as a dump truck.

BACKGROUND

Work vehicles are configured to perform a wide variety of tasks including use as construction vehicles, forestry vehicles, lawn maintenance vehicles, as well as on-road vehicles such as those used to plow snow, spread salt, or vehicles with towing capability. Additionally, work vehicles include agricultural vehicles, such as a tractor or a self-propelled combine-harvester, which include a prime mover that generates power to perform work.

In one example of a construction vehicle, a dump truck includes an articulated dump body, or dump bin, which is moved between a down position and an up position to provide for the transportation of a material from one location to another. The transported material can include a fluid, a solid material, and aggregates of the same material or of different materials. Most generally aggregates of materials are transported in a dump truck, since the aggregates tend to flow relatively easily from the articulated bin when one end is elevated with respect to another end. The articulated bin typically includes bin lift cylinders positioned such that the force exerted by the cylinders moves the bin from a generally horizontal position to an inclined position. Other dump truck designs use multi-stage lift cylinders to take advantage of the fact that decreasing force is required as lift increases. A multi-stage cylinder at an initial extension provides a high force at low speed. As the cylinder extension continues and the additional stages are activated, speed increases and force decreases.

The dump bin of a dump truck is configured to store a large amount of solid material and/or aggregates weighing up and in excess of forty-six (46) tons of material. In one configuration of a dump truck, the vehicle includes three axles each being connected to a pair of tires. Generally the cab is located above a first axle toward the front of the vehicle, and the weight of the stored material located in the bin is mainly supported by a second and third axle. The second axle is generally located substantially beneath a center of the stored material located in the bin, and the third axle is located at the trailing end of the truck.

In many types of dump trucks, one or more of the axles includes two half axles or half shafts, each of which is coupled to a differential. In one or more embodiments, the differential is an open differential which enable the axles, and therefore the wheels, to rotate at different speeds or in opposite directions. By enabling the wheels to rotate at different speeds, which can occur when turning, tire scuffing is avoided.

Under these and other conditions, it is important to determine the rotational speed of each of the wheels. For instance, low traction conditions can be susceptible to wheel slip which needs to be monitored and mitigated if necessary. Speed sensors can be employed and are operatively connected to a vehicle control unit. The vehicle control unit, upon receiving a speed sensor signal from one or more of the speed sensors, adjusts the speed of an engine, a transmission, or a motor, to change the rotational force applied through the wheels. In different configurations, the speed sensors are located in wheel housings. In other work vehicles, axle speed sensors are not used and ground speed radar is used instead. In these systems, the speed determined by the ground speed radar is compared to the transmission output speed signal. In these systems, when wheel slip is detected and other required conditions are met, the differential lock is automatically engaged to mitigate wheel spin. Dump trucks due to the heavy weights being hauled, however, should include a sensor system that is accurate in all conditions, since ground conditions and the weight being hauled can affect the sensor system's ability to detect speed accurately. What is needed therefore, is a sensor system that provides accurate and timely speed sensor signals under a wide variety of operating conditions.

SUMMARY

In one embodiment, there is provided an axle speed sensing system for a vehicle having an engine, a transmission, a differential, and an axle coupled to the differential. The sensing system includes a sensor target disposed at the axle and a sensor configured to transmit a sensor signal, wherein the sensor is located adjacently to the sensor target. A controller is operatively connected to the sensor. The controller includes an input configured to receive the sensor signal and an output configured to provide a control signal to control the operation of one or more of the engine, the transmission, and the and the axle.

In another embodiment, there is provided a work vehicle including a plurality of wheels, a plurality of axles, each being operatively connected to one of the plurality of wheels, and one or more differentials, each being operatively connected to at least one of the plurality of axles and configured to drive the axles. A transmission is operatively connected to the one or more differentials and a plurality of sensor targets are each disposed at one of the plurality of axles. A plurality of sensors are each disposed adjacent to one of the plurality of sensor targets, wherein each of the plurality of sensors is configured to transmit a sensor signal. A controller is operatively connected to each one of the plurality of sensors, wherein the controller includes an input configured to receive the sensor signal from each of the plurality of sensors and an output configured to provide a control signal to control the operation of one or more of the engine, the transmission, and the plurality of axles.

In a further embodiment, there is provided a method of forming an axle from a steel bar for a vehicle having a speed sensor, a differential, a wheel hub, and a brake plate. The method includes: i) forming an axle to include a first end and a second end; ii) forming, between the first end and the second end, brake plate splines configured to be coupled to the brake plate of the vehicle; and iii) forming, between the first end and the second end, a sensor target, wherein the sensor target includes a plurality of features configured to be sensed by the speed sensor.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Figure 1:
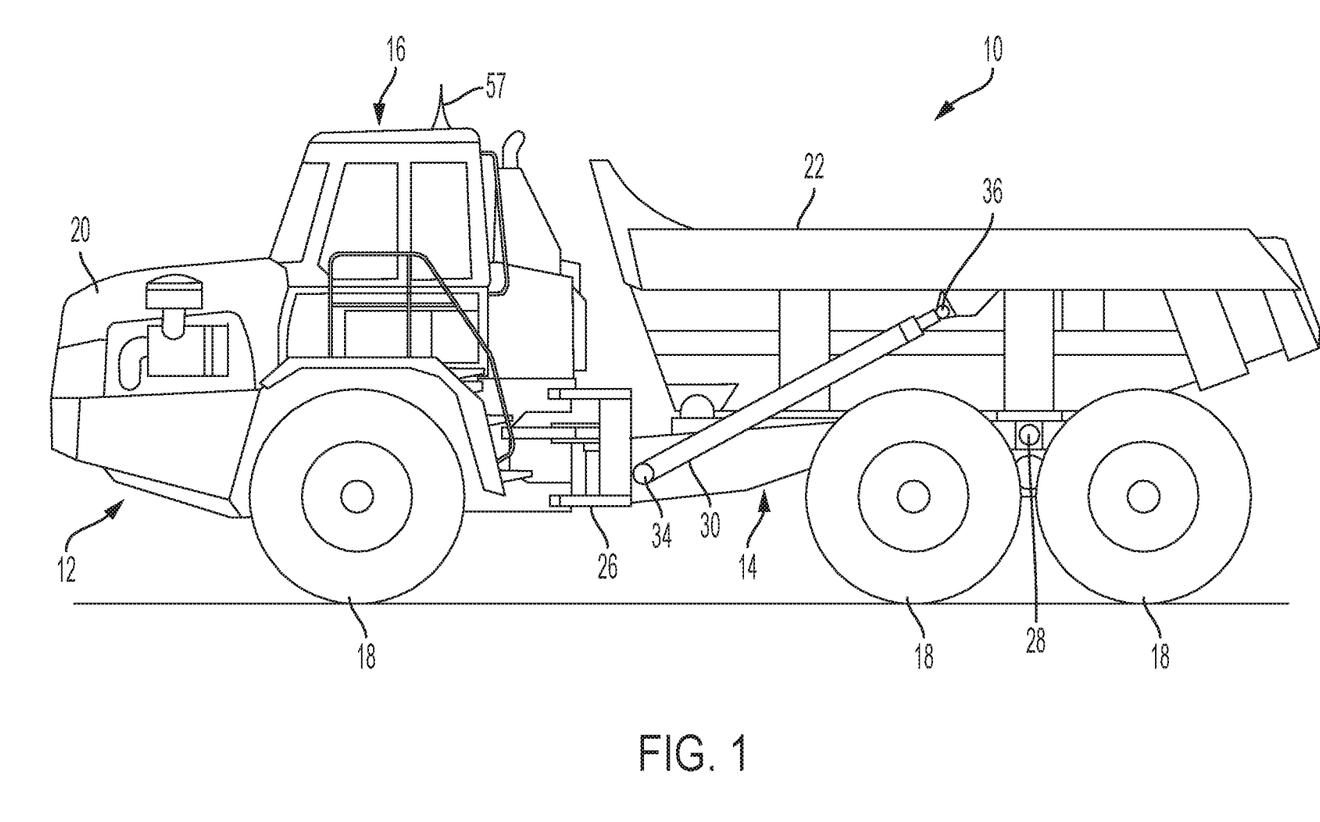
FIG. 1 is a side elevational view of an articulated dump truck showing a bin in a loading position.

FIG. 1 is a side elevational view of an articulated dump truck 10 including an articulated frame having front and rear frame sections 12 and 14, respectively. An operator cabin 16 is supported by the frame section 12 and a plurality of wheels 18 support the dump truck 10 for movement over the ground or other surface. An engine (not shown) is located within an engine compartment 20, to power operation of the dump truck 10, and a dump body or bin 22 for holding material to be hauled, is supported by the frame 14. The front and rear frame sections 12 and 14 are pivotally coupled to each other through an articulation joint 26. In other embodiment, the dump truck is a non-articulated vehicle.

The bin 22 is mounted to the rear frame section 14 for pivoting about a horizontal transverse axis defined by right and left coupling pin assemblies 28. First and second, single stage bin lift cylinders are located on either side of the bin 22. First cylinder 30 is shown and the other cylinder is provided at an opposite side of the rear frame section 14. Each of the cylinders 30 includes a head end pivotally coupled, for instance, at a pin 34 illustrated for the first cylinder 30. The pin 34 is coupled to a lower front region of the rear frame section 14 and includes a rod end coupled at a pin 36, to an upper central region of the bin 22. When the lift cylinders 30 are in a fully retracted position, the bin 22 is in a completely lowered loading position wherein a bottom of the bin overlies and is supported by the rear frame section 14, as shown in FIG. 1. When the lift cylinders are fully extended, the bin 22 is pivoted upwardly about the coupling assembly 28 so that the bottom of the bin 22 makes a tipping angle of up to approximately seventy (70) degrees with respect to a horizontal axis defined by the frame sections 12 and 14. A position sensor (not shown) is located adjacently to or at the assembly 28 about which the bin 22 rotates. The position sensor, in one embodiment, is a rotary Hall-effect sensor. The operator cabin 16 encloses a seat, a steering wheel, a user control interface, a fuel pedal, and additional pedals for a brake and a clutch (not shown) as is known by those skilled in the art.

Figure 2:
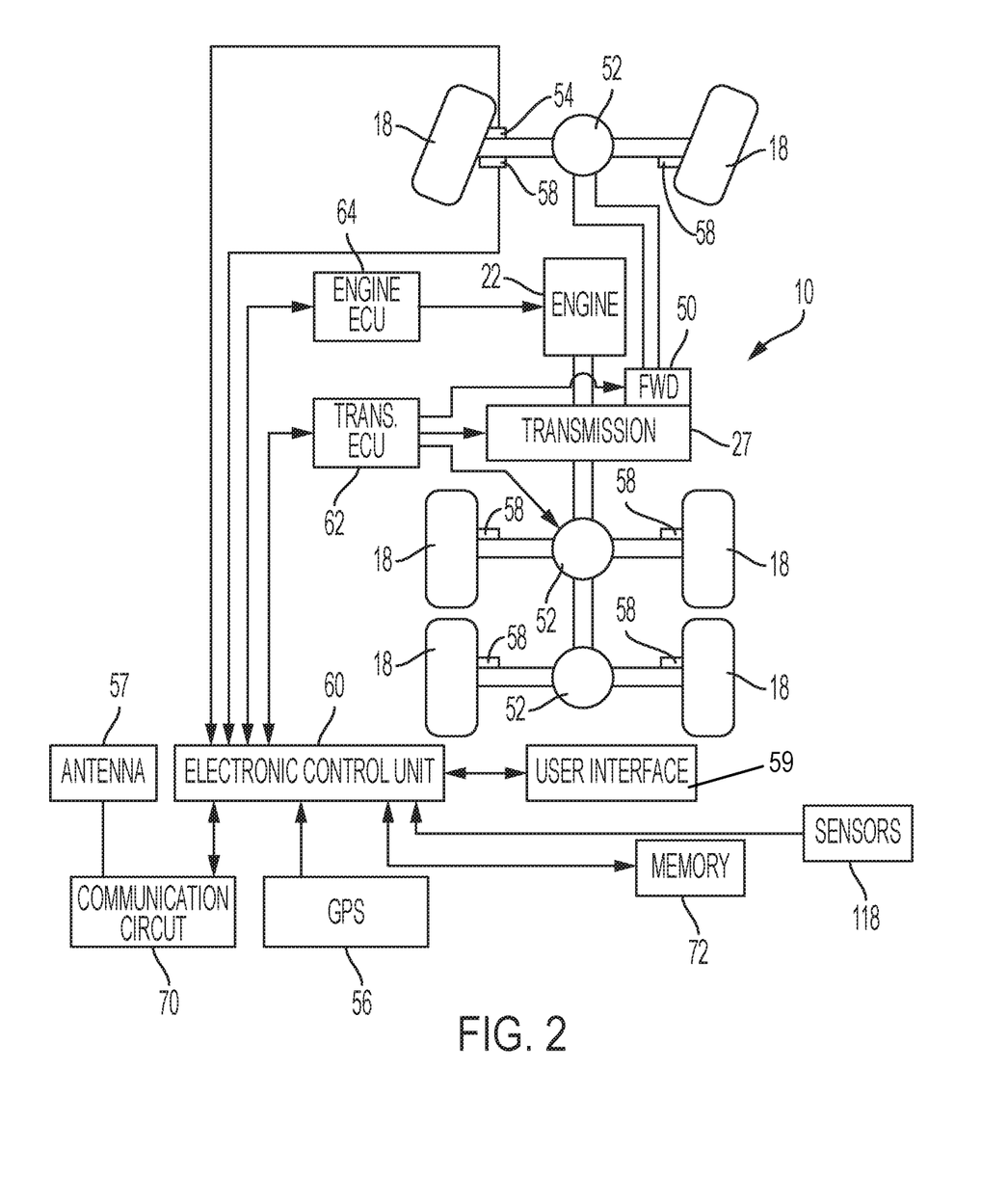
FIG. 2 is a simplified schematic diagram of an electro-hydraulic control system for a work vehicle having steerable wheels.

FIG. 2 is a simplified schematic diagram of the vehicle 10 and a control system embodying the invention. A transmission 27 includes an electronically controlled front wheel drive (FWD) control unit 50 and one or more electronically or electro-hydraulically controlled locking differentials 52. The front wheel drive control unit 50 is coupled to the steerable front wheels 18. When the front wheel drive control unit 50 is on, torque is transmitted from the transmission 27 to the front wheels 18. When the front wheel drive control unit 50 is off, torque is not transmitted from the transmission to the front wheels 18.

The locking differential 52 is coupled to one or more of the driven wheels 18. When the differential lock control unit 52 is unlocked (off, open differential), it allows each of the rear wheels 18 to rotate at different speeds, such as when negotiating a turn. By contrast, when the locking differential 52 is on or locked, it forces both left and right wheels on the same axle to rotate at the same speed under nearly all circumstances. While a locking differential 52 is shown for each pair of wheels, other configurations of locking differentials are contemplated.

A wheel angle sensor 54 senses the angular position of the wheels 18. A guidance computer 56, which in different embodiments includes different types of guidance computers including GPS unit, provides a vehicle position signal. The vehicle includes an antenna 57. Work vehicles without a guidance computer are also contemplated. A wheel speed sensor assembly 58 provides a wheel speed signal for one or more of each of the wheels. In other embodiments, less than all of the wheels 18 include wheel speed sensor assemblies.

A main electronic control unit (ECU) 60 is connected to the wheel angle sensor 54, the GPS unit 56, and the wheel speed sensor assembly 58. The ECU 60 communicates with a transmission ECU 62 and with an engine ECU 64.

Transmission ECU 62 controls the transmission 27 and provides control signals to the front wheel drive control unit 50 and to the locking differential 52. The engine ECU 64 controls the engine 18. A user interface 59 is connected to the main ECU 60. The GPS unit 56 is a conventional GPS unit. In one embodiment, the GPS unit 56 is configured to locate the position of the vehicle 10 within an area being worked.

A communication circuit 70 is coupled to the ECU 60 and to the antenna 57. The communication circuit 70 is configured to transmit signals generated by the ECU 60, which in some applications have been generated in response to information submitted by an operator through the user interface 40, located in the cab 18. The communication circuit 70 is further configured to receive signals from the antenna 57. A memory 72 is operatively coupled to the ECU 60 and is configured to store information. In some embodiments, the communication circuit 70 is used for internal communication among devices or circuits located in the vehicle.

The ECU 60, in different embodiments, includes a computer, computer system, control circuitry, or a programmable device, e.g., multi-user or single-user computers. In other embodiments, the ECU 60 includes one or more processors (e.g. microprocessors), and the associated internal memory including random access memory (RAM) devices comprising the memory storage of the ECU 60, as well as any supplemental levels of memory, e.g., cache memories, non-volatile or backup memories (e.g. programmable or flash memories), read-only memories, etc. In addition, the memory can include a memory storage physically located elsewhere from the processing devices and can include any cache memory in a processing device, as well as any storage capacity used as a virtual memory, e.g., as stored on a mass storage device or another computer coupled to ECU 60 view the communication circuit 70. The mass storage device can include a cache or other dataspace which can include databases. In addition to internal memory or in place of internal memory, a memory 72 is operatively coupled to the ECU 60 and is configured to store information. Each of the transmission ECU 62 and engine ECU 64, in different embodiments, includes the above described components and features.

Figure 3:
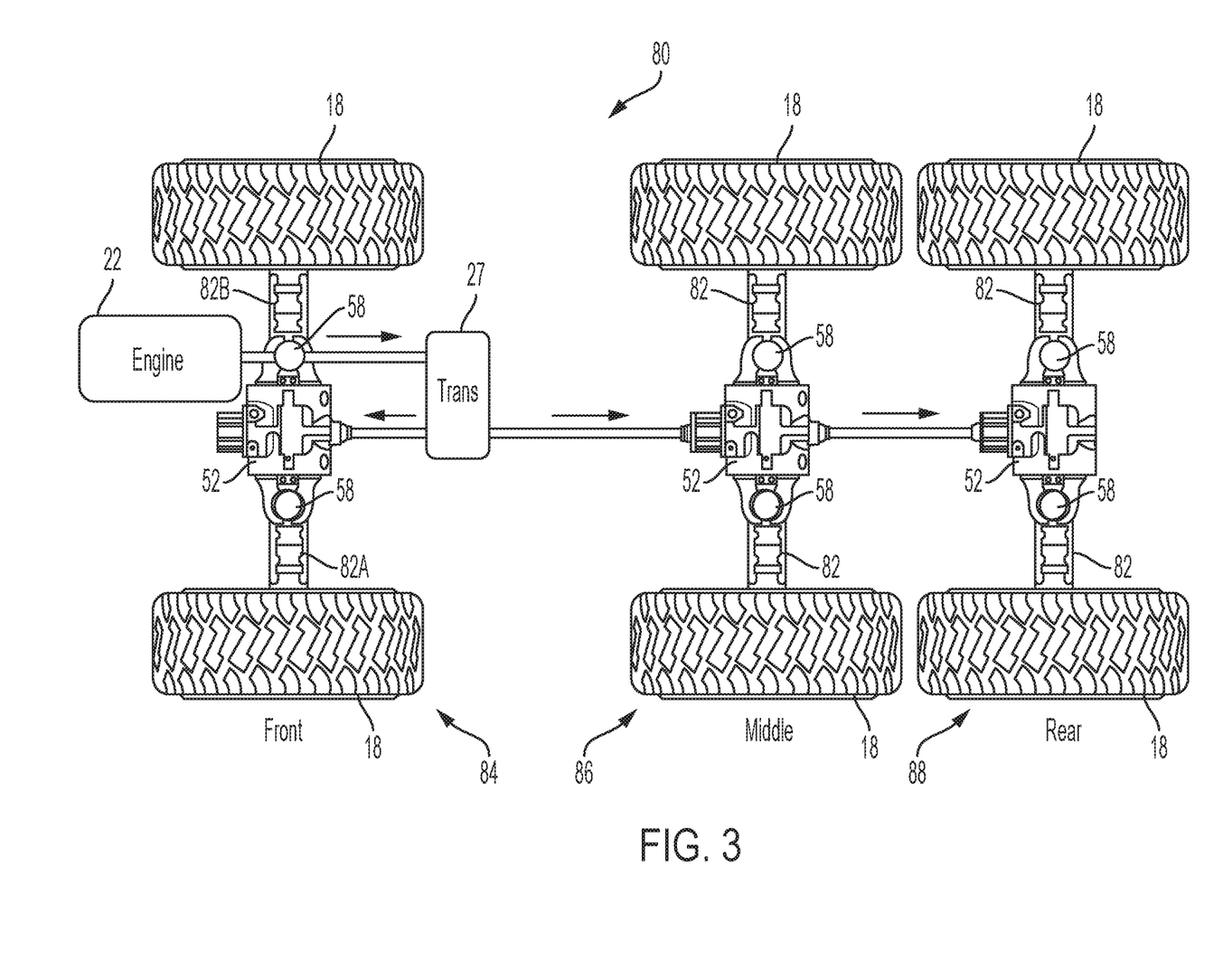
FIG. 3 is a diagrammatic view of a vehicle drive train.

FIG. 3 illustrates a diagrammatic view of a vehicle drive train 80 illustrating the engine 22 operatively connected to the transmission 27, which in turn in operatively connected to each of the locking differentials 52. Each of the locking differentials 52 is operatively connected to wheels 18 through a half shaft 82 assembly. Each half shaft 82 assembly is driven by the correspondingly connected locking differential 52 as is understood by a person of ordinary skill in that art. The speed of each half shaft assembly 82 is determined by one of the plurality of wheel speed sensor assemblies 58. The speed of each half-shaft assembly is proportional to the wheel speed. As illustrated, a front axle assembly 84 includes two of the wheel speed sensor assemblies 58, a middle axle assembly 86 includes two of the wheel speed sensor assemblies 58, and a rear axle assembly 88 includes two of the wheel speed sensor assemblies 58. In other embodiments, at least one of the axle assemblies 84, 86, and 88 does not include any wheel speed sensor assemblies 58. In one particular embodiment, the front axle assembly 84 and the rear axle assembly 88 include wheel speed sensor assemblies 58, but the middle axle assembly 86 does not.

Figure 4:
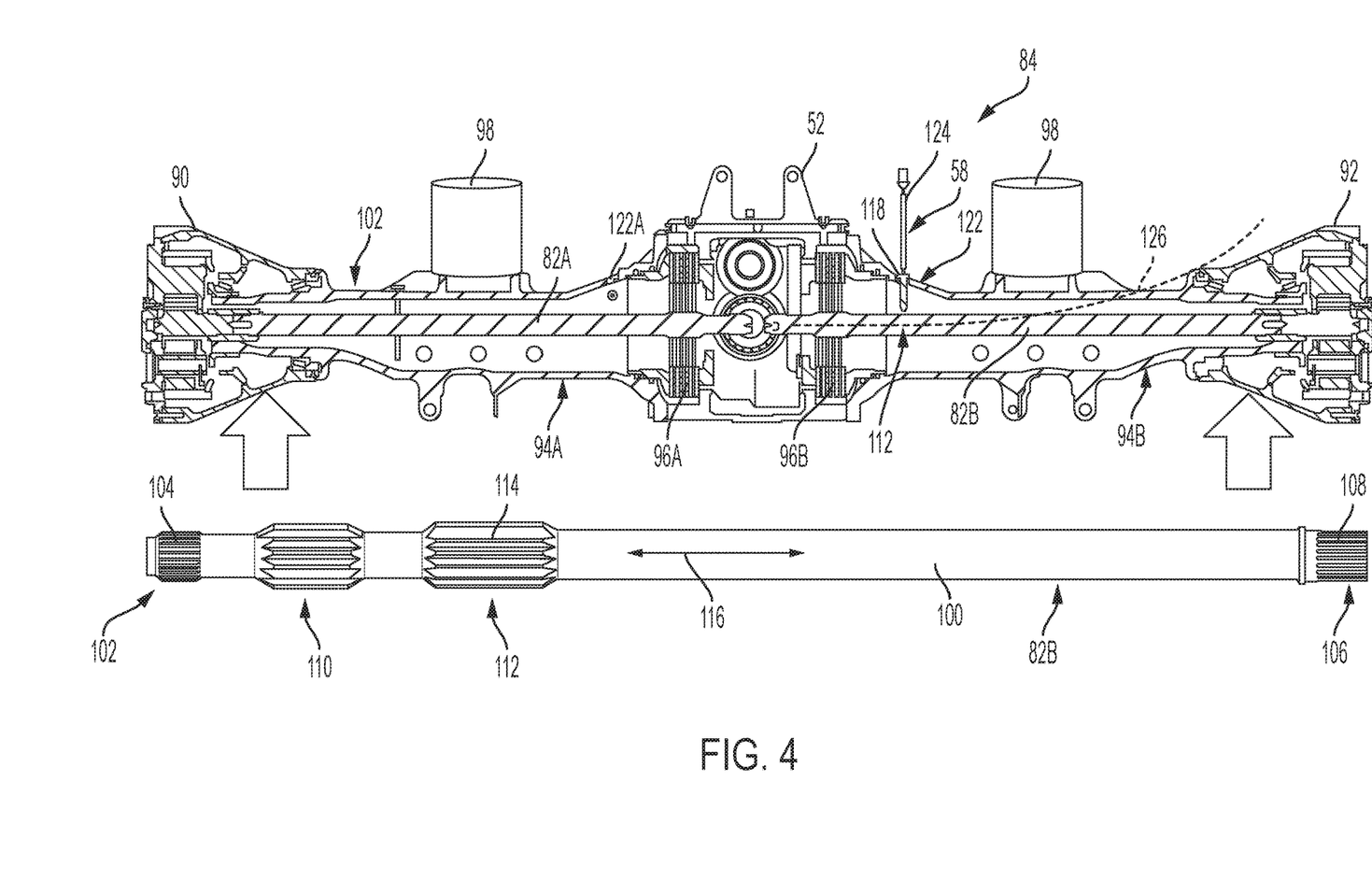
FIG. 4 is a diagrammatic view of a cross-section of a front axle assembly.

FIG. 4 illustrates a diagrammatic view of the front axle assembly 84. The front axles assembly includes a first wheel assembly 90 operatively connected to the half shaft assembly 82A and a second wheel assembly 92 operatively connected to the half shaft assembly 82B. Each half axle assembly 94A and 94B includes correspondingly a half shaft 82A and a half shaft 82B.

The locking differential 52 includes a first brake assembly 96A operatively connected to the half shaft 82A and a second brake assembly 96B operatively connected to the half shaft 82B. Each of the brake assemblies 96A and 96B are configured to apply a braking force to the connected half shaft as would be understood by one of skill in the art. The axle assembly 84 includes first and second suspension blocks 98 configured to support the frame on the axle assembly 84.

Each of the half shafts 82A and 82B are similarly configured and half shaft 82B is illustrated in further detail to show a configuration of the half shafts. The half shaft 82B includes a shaft 100 including a first end 102 having splines 104 and a second end 106 having wheel splines 108. The splines 104 are operatively connected to and driven by the locking differential 52. The splines 108 are operatively connected to the second wheel assembly 92. Disposed between the first end 102 and the second end 106 are brake splines 110 which are operatively connected to the brake 96B. In one embodiment, the axle joins the differential 52 to a coupler which transmits torque to a sunshaft of the outboard planetary system of the axle which in turn provides torque to the wheel hubs.

The half shaft 82B further includes a sensor target 112 disposed between the brake splines 110 and the wheel splines 108 and located more closely to the brake splines 110 than to the wheel splines 108. Other locations of the sensor target 112 are contemplated. For instance, in other embodiments, the sensor target is located at one of many rotating components of the axle linked proportionally to wheel speed. The target 112 includes a plurality of features, such as splines 114, each of which extend from a longitudinal axis 116 of the half shaft 82B. The splines 114 are regularly spaced about the axle. In one embodiment, the splines includes a shape defined by an involute curve. In one embodiment the sensor target is formed from the same material as the axle. In other embodiments, the sensor target is formed of a material different than the material of the axle.

The speed sensor assembly 58 includes the sensor target 112 and a sensor 118 that is fixedly connected to an axle housing 120 at an aperture 122. An aperture 122A is illustrated without a sensor 118 and represents a mounting location of a second sensor (not shown). The sensor 118 is operatively connected to a wiring harness 124 that transmits sensor signals from the sensor 118 to the electronic control unit 60 seen in FIG. 2. The sensor 118 is spaced from the sensor target 112 by a predetermined distance. In the illustrated embodiment, a second sensor is not shown at the aperture 122A, since the half shaft 82A does not include a sensor target. In other embodiments, each of the half axles 82 include a sensor target 112. See FIG. 7 for the additional sensor 118.

As seen in FIG. 4, a dashed line 126, which is curved with respect to the longitudinal axis 116, represents an exaggerated load stress condition at the half shaft 82B when the vehicle 10 is transporting material. In this stress condition, each of the half shafts 82A and 82B bend under the weight of the load and consequently, the distance between the target 112 and the sensor 118 changes depending on the weight being carried.

The sensor 118 is spaced from the sensor target 112 by a predetermined distance when the axle is under a no-load condition, wherein the no-load condition of the vehicle is determined when the bin 22 is empty of material.

In one embodiment, the sensor 118 is a Hall effect sensor configured to detect changes in the magnetic field provided by the target 112. In the illustrated embodiment, the target 112 is formed as a feature of the half shaft 82 during formation of the axle in a manufacturing process.

In one embodiment, the axle is made of steel bar stock which is machined to cut the splines 114 in one or more configurations. In different embodiments, the configuration, i.e., the spacing and size of splines depends in part on the type of vehicle, the vehicle size, the type of axles, and weight being moved by the vehicle. Other factors for determining the configuration of the splines are contemplated. In one embodiment, the splines 114 are formed in a hobbing process applied to the steel bar. Other processes for forming the splines 114 are contemplated.

In the illustrated embodiment of FIG. 4, the splines 114 extend along radiuses, each of which extends from the longitudinal axis 116 of the half shaft 82. As further illustrated in FIG. 5, each of the splines 114 includes a major diameter 130 that is spaced from the axis a predetermined distance. Sides of the splines 130 curve away from the major diameter 130 of the spline 114 toward the half shaft 82. The sensor 118 is located adjacently to the axle 82 and is spaced from the major diameter of the splines 114 by a distance D. This distance D defines an air gap 132 between the sensor 118 and the splines 114.

Figure 5:
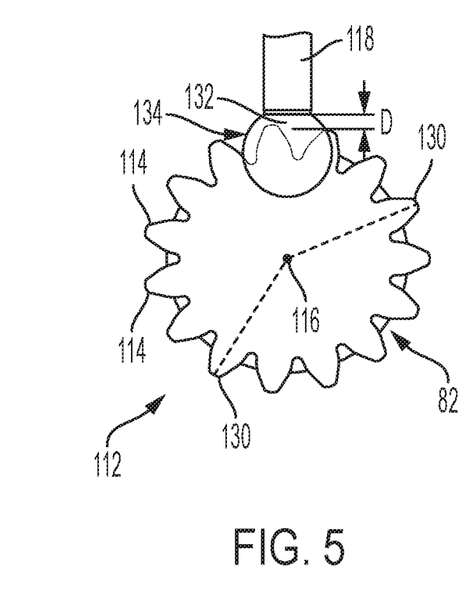
FIG. 5 is a diagrammatic view of one embodiment of a sensor spaced from a target.

The air gap 132 is determined, in part, by the sensitivity of the sensor 118 to the material of the half shaft 82 and a deflection distance of half shaft 82 under a "full load" transported by the vehicle. "Full load" is defined by manufacturer. In other embodiments, a percentage deflection distance of the half shaft 82 is used to determine the air gap 132. A shaded circle 134 of FIG. 5 illustrates generally a range of a magnetic field sensed by the sensor 118. In one exemplary embodiment, the distance between the sensor and the major diameter 130 of the splines is based on the deflection of the shaft 82 when fully loaded with respect to the major diameter 130 and a maximum tolerance condition of the major diameter 130 and the sensor 118. For instance, the defection of the half shaft 82 when fully loaded to contact the major diameter 130 is about 1.5 millimeters, and the stackup of tolerance conditions is about 1.5 millimeters. In this example, an air gap of 3 to 4 millimeters is set between the major diameter 130 and the sensor 118 in an unloaded condition. Other air gaps are contemplated and depend on the deflection of the axle under a load condition and tolerance stackups.

Because the axles are made of steel or iron, a ferrous material, the sensor 118 determines the magnitude of a magnetic field induced by the axle materials that form the individual splines, in combination with the Hall effect sensor. The magnetic field is altered and sensed by the sensor 118 depending on the location of the splines (also described as teeth) with respect to the sensor. The sensor senses a magnetic field of the target 112 which changes depending on whether the sensor senses a spline or a space between the splines. Consequently, the sensor 118 provides a voltage or current signal that varies proportionally depending on whether the sensor is located over a spline/tooth or a gap between splines/teeth. In one embodiment, the sensor 118 transmits a waveform to the controller 60 that includes a series a pulses.

Figure 6:
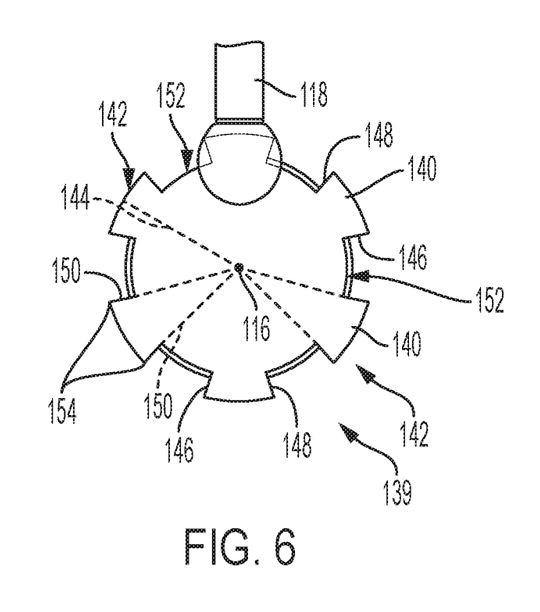
FIG. 6 is a diagrammatic view of another embodiment of a sensor spaced from a target.

FIG. 6 illustrates a cross-sectional view of another embodiment of a step spline target 139 including a plurality of step features, such as step splines 140, extending from the longitudinal axis 116 of half shaft 82. Each of the step splines 140 includes a top surface 142 which is generally curved, wherein each point on the surface is the same distance from the center of the half shaft 82, identified by the longitudinal axis 116. Each point on the surface is the same distance from the longitudinal axis identified by a radius 144. In other embodiments, the top surface 142 is not curved.

Each of the step splines 140 includes a first side 146 and a second side 148. The sides 146 and 148 extend longitudinally along the longitudinal axis 116. As seen in FIG. 6, the step spline includes three sides, the top surface 142, the first side 146, and the second side 148. Each of the sides 146, 148, in one or more embodiments, is generally planar and aligned with a radius 150. In this configuration the planar sides extend from the top surface 140 to the axis 116. An intersection of each of the sidewalls with the top surface defines an edge forming a relatively sharp transition configured to be sensed by the sensor. A chamfer at the intersection of the side walls and the top surface is also contemplated. Each of the step splines 140 is separated by a space 152 (an area without a spline) which includes a curved surface that is recessed from the surfaces 142. By locating the sides 146 and 148 along the radius, the sides of the step splines 140 are undercut, such that the distance along the top surface 142 along the outer circumference of the step spline target 139 is greater than the distance between the sides 146 and 148 at the space 152. In one exemplary embodiment, the curved surfaces at the space 152 include generally the same contour as the surfaces 142. By undercutting the sides 146 and 148, a relatively sharp transition between the surface 142 and the space 152 is provided by edges 154. Other contours are contemplated. In other embodiments, sides that are not undercut are also contemplated. When the sensor 118 encounters an edge 154, a signal indicating a transition is transmitted to the controller 60. Consequently, the embodiment of FIG. 6 which includes six step splines, provides 12 transitions which are recognized by the sensor 118 and the controller as six pulses.

Figure 7:
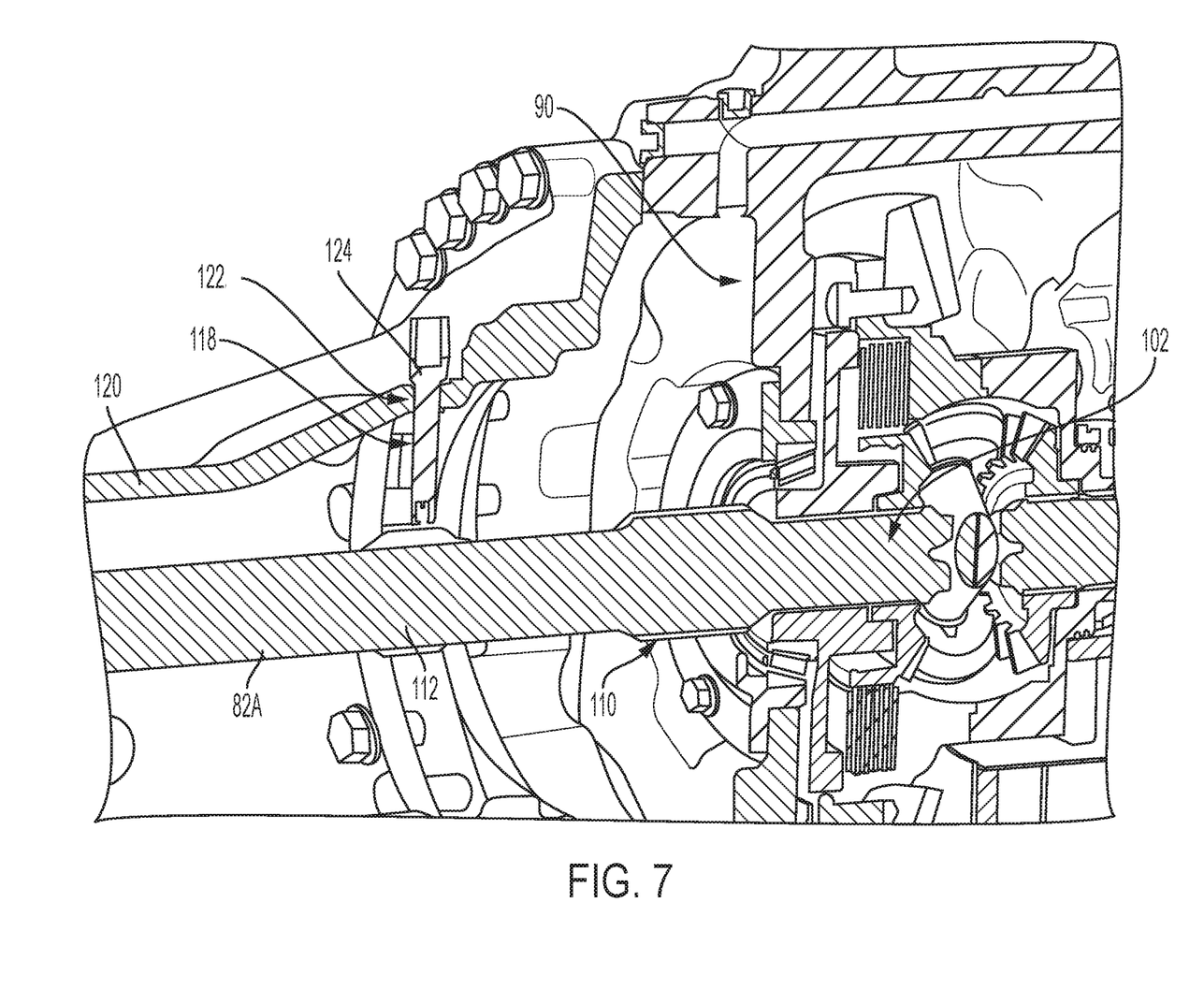
FIG. 7 is a diagrammatic view of a portion of the cross-section of a front axle assembly.

FIG. 7 illustrates a portion of the cross-sectional view of FIG. 4 illustrating the half shaft 82A disposed within the housing 120. The sensor 118 is located at the aperture 122A and is spaced from the target 112 as described in FIG. 6. A portion of the electrical connector 124 is shown. The sensor is fixed at the aperture 122A and is held by the housing 120 in a fixed position. When the vehicle 10 experiences a load, a gap between the target 112 and the sensor 118 changes based on the weight of the load.

FIGS. 8A-8D illustrate a plurality of different embodiments of step spline targets 139, each including a different plurality of step splines 140. Each of the embodiments illustrates one half of a step spline target 139 such that a complete step spline, such as step spline target 139A of FIG. 8A, includes 4 step splines 140. The complete step spline target 139B of FIG. 8B includes 6 step splines. The complete step spline target 139C of FIG. 8C includes 8 step splines. The complete step spline target 139D of FIG. 8D includes 10 step splines. The complete step spline target 139E of FIG. 8E includes 12 step splines.

Figure 8A:
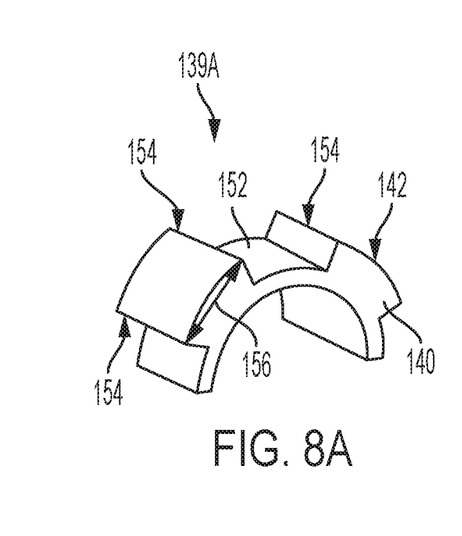
FIGS. 8A-8E illustrates a plurality of different embodiments of a sensor target.
Figure 8B:
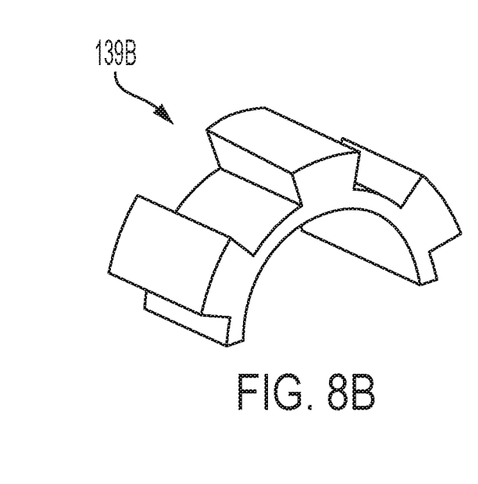
Figure 8C:
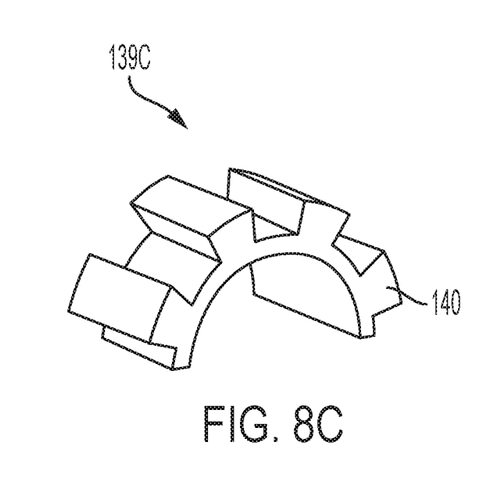
Figure 8D:
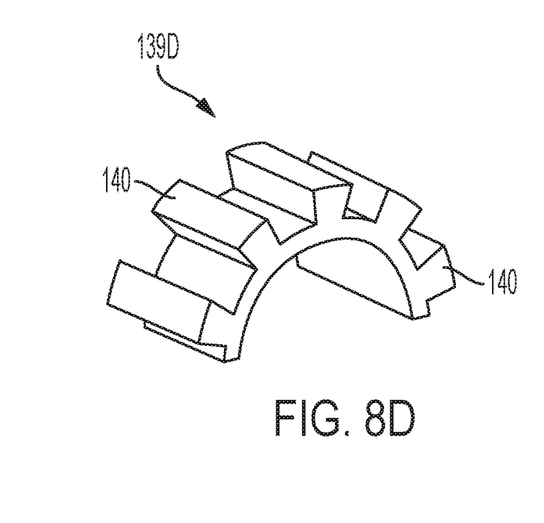
Figure 8E:
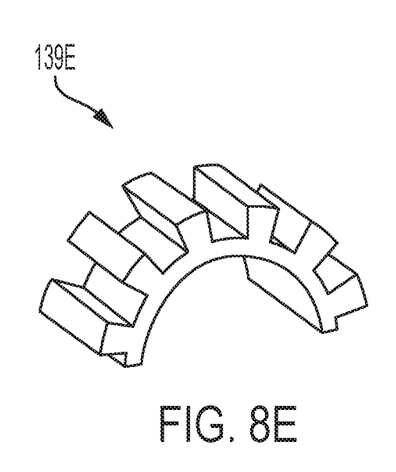

Each of the plurality of different embodiments is configured to be directed to a specific application of determining the rotational speed of the axle and consequently the speed of a wheel coupled to the axle. For instance, a width 156 of surface 142 in a target 139 is wider in those embodiments having fewer step splines. While the wider surface provides a larger target for the sensor, there are fewer splines, and consequently, the resolution of the system limits how quickly the rotational speed of the axle can be determined in a wheel slip event. A greater number of step splines 140, such as provided in FIG. 8D provides a greater resolution for more quickly determining axle speed, but may not perform as well at larger air gap conditions. The system using this embodiment, however, could require changes to the sensor since the number of targets moving by the sensor is greater than the number of targets moving by the sensor in the FIG. 8A embodiment. Consequently, the number of target splines 140 to be included in the target 139 is based on the type of vehicle, including operating wheel speeds, and the resolution provided by the sensor 118 and the controller 60 to which it is coupled. The number of target splines is determined, in one embodiment, as a balance of air gap capability and the degrees of axle rotation permitted before a wheel slip condition is determined, which would cause the automatic differential-lock system to be engaged. Consequently, the number of target splines is determined based on the type of vehicle and how much slip rotation is acceptable before the automatic differential-lock system is engaged. In one embodiment of an articulated dump truck for instance, the determined number of step splines is 8 step splines as illustrated in FIG. 8C.

While exemplary embodiments incorporating the principles of the present invention have been disclosed hereinabove, the present invention is not limited to the disclosed embodiments. Instead, this application is intended to cover any variations, uses, or adaptations of the invention using its general principles. For instance, while the targets are provided during the formation of an axle, the targets in other embodiments are components that are separately produced from the production of the axle, and are fixedly attached to the axle once formed. Consequently, this application is intended to cover such departures from the present disclosure as come within known or customary practice in the art to which this invention pertains.

The invention claimed is:

1. A wheel speed sensing system for a vehicle having an engine, a transmission, a differential, and an axle coupled to the differential, the sensing system comprising:
    a sensor target disposed at a rotating component of the axle, wherein the sensor target is formed from a same material as the axle is formed;
    a sensor configured to transmit a sensor signal, the sensor located adjacently to the sensor target, wherein the sensor is spaced from the sensor target by a predetermined distance defining an air gap between the sensor and the sensor target, the predetermined distance based on a deflection distance of the axle determined between a no-load condition and a load condition of the vehicle; and
    a controller operatively connected to the sensor, wherein the controller includes an input configured to receive the sensor signal and an output configured to provide a control signal to control the operation of one of the engine, the transmission, and the axle.

2. The wheel speed sensing system of claim 1 wherein the target includes a plurality of features extending from the rotating component of the axle, wherein each of the plurality of features is spaced from an adjacent feature by an area lacking one of the plurality of features.

3. The wheel speed sensing system of claim 2 wherein the axle defines a longitudinal axis and each of the plurality of features includes a cross section disposed at a right angle to the longitudinal axis and defining three sides.

4. The wheel speed sensing system of claim 3 wherein the feature includes a first side, a second side, and a third side, wherein the first side and the second side each terminate at the third side and terminate at different first and second areas.

5. The wheel speed sensing system of claim 4 wherein the sensor is spaced from the third side of one of the features by the predetermined distance defining the air gap between the sensor and the third side and wherein the predetermined distance is further based on tolerance stackups.

6. The wheel speed sensing system of claim 4 wherein the third side includes a curved surface, wherein substantially each point on the curved surface is substantially the same distance from the longitudinal axis.

7. The wheel speed sending system of claim 6 wherein the curved surface is displaced from the longitudinal axis by a constant radius.

8. The wheel speed sensing system of claim 6 wherein the first side and the second side each define a plane disposed along a radius extending from the longitudinal axis to the third surface.

9. The wheel speed sensing system of claim 8 wherein the area disposed between two of the plurality of features defines a surface wherein each point on the surface is substantially the same distance from the longitudinal axis.

10. The wheel speed sensing system of claim 8 wherein the plurality of features includes step splines.

11. The wheel speed sensing system of claim 10 wherein the predetermined distance is further based on a predicted manufacturing tolerance.

12. The wheel speed sensing system of claim 1 wherein the sensor target is formed of the same material as the axle from a steel bar machined to form the sensor target and brake plate splines.

13. A work vehicle including a differential-lock system susceptible to a wheel slip event, the work vehicle comprising:
    a plurality of wheels;
    a plurality of axles, each being operatively connected to one of the plurality of wheels;
    one or more differentials, each being operatively connected to at least one of the plurality of axles and configured to drive the axles;
    a transmission operatively connected to the one or more differentials;
    a plurality of sensor targets each being disposed at a rotating component one of the plurality of axles linked proportionally to wheel speed, wherein each of the plurality of sensor targets includes a plurality of features extending from the rotating component of one of the plurality of axles, wherein the plurality of features is determined based on degrees of axle rotation permitted before a wheel slip condition is determined;
    a plurality of sensors each being disposed adjacent to one of the plurality of sensor targets wherein each of the plurality of sensors is configured to transmit a sensor signal, wherein each of the plurality of sensors is spaced from one of the plurality of sensor targets by a predetermined distance defining an air gap between the sensor and the sensor target, the predetermined distance being determined based on a deflection distance of the axle between a no-load condition and a load condition of the vehicle; and
    a controller operatively connected to each one of the plurality of sensors, wherein the controller includes an input configured to receive the sensor signal from each of the plurality of sensors and an output configured to provide a control signal to control the operation of one or more of the engine, the transmission, and axles.

14. The work vehicle of claim 13, wherein each of the plurality of features is spaced from an adjacent feature by an area lacking one of the plurality of features.

15. The work vehicle of claim 14 wherein the axle defines a longitudinal axis and each of the plurality of features includes a cross section disposed at a right angle to the longitudinal axis and defining three sides.

16. The work vehicle of claim 15 wherein the three sides includes a first side, a second side, and a third side, wherein the first side and the second side each terminate at the third side.

17. The work vehicle of claim 16 wherein the plurality of features include step splines, wherein each of the sides is aligned substantially with a radius extending from a longitudinal center of the axle.

18. The work vehicle of claim 17 wherein the sensor is spaced from the third surface of one of the step splines by a predetermined distance to define the air gap between the sensor and the third surface.

19. A method of forming an axle from a steel bar for a vehicle having speed sensor, a differential, a wheel hub, and a brake plate, the method comprising:
    forming the axle to include a first end and a second end;
    forming, between the first end and the second end, brake plate splines configured to be coupled to the brake plate of the vehicle; and
    machining the axle, between the first end and the second end, to form a sensor target, wherein the sensor target includes a plurality of features configured to be sensed by the speed sensor, wherein the sensor target is formed of the same material as the axle.

20. The method of claim 19 wherein the forming the sensor target further comprises forming the sensor target to include a plurality of features each including a top wall having a surface spaced from a longitudinal axis of the axle by a predetermined radius, and a first and second wall each connected to the surface, wherein each of the first and second wall defines a plane aligned with a radius extending from the longitudinal axis.

* * * * *